Dec. 10, 1968   E. STOLZ   3,415,415
CONTAINER HANDLE ATTACHMENT
Filed March 11, 1966
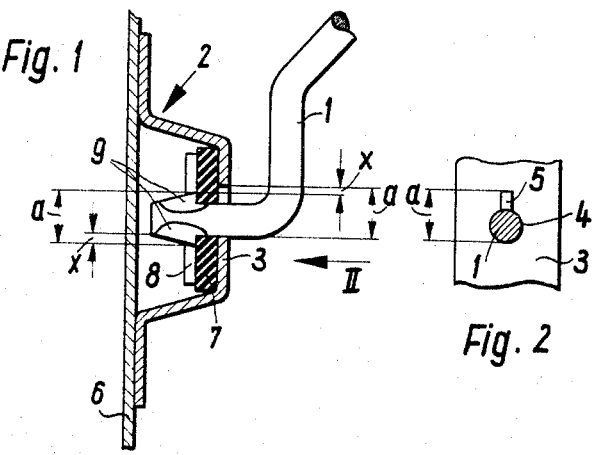
Inventor:
EBERHARD STOLZ
By Young & Thompson
Attys.

United States Patent Office 3,415,415
Patented Dec. 10, 1968

3,415,415
CONTAINER HANDLE ATTACHMENT
Eberhard Stolz, Kreis Siegen, 15 Wiesenstr.,
5908 Altenseelbach, Germany
Filed Mar. 11, 1966, Ser. No. 533,628
Claims priority, application Germany, Mar. 18, 1965,
H 55,502
5 Claims. (Cl. 220—91)

ABSTRACT OF THE DISCLOSURE

A handle is swingably attached to a container by a plate secured to the container and having an outwardly projecting intermediate portion with an opening therethrough. A resilient member on the inner side of that intermediate portion partially closes the opening. The end of the handle has a laterally extending portion such that when the end of the handle is pushed through the opening, the laterally extending portion pushes aside the resilient material that overlaps the opening. The handle is turned out of alignment with its path of entry when the container is suspended from the handle.

---

The present invention relates to containers having handles, more particularly to special attachment means for securing the handle to the container. The invention is particularly concerned with the containers having handles of the bail type, in which both ends of the handle are connected, and preferably swingably connected, to the container.

It is an object of the present invention to provide handle attachments for containers, which will be relatively simple and inexpensive to manufacture, easy to assemble, and rugged and durable in use.

Other objects and advantages of the present invention will become apparent from a consideration of the following description, taken in connection with the accompanying drawing, in which:

FIG. 1 is a cross-sectional view of one form of handle attachment according to the present invention; and FIG. 2 is a fragmentary side view of FIG. 1, taken in the direction of the arrow II in FIG. 1.

Referring now to the drawing in greater detail, there is shown an assembly according to the present invention, comprising a carrying handle 1 of the bail type. Handle 1 has both ends received in attachement structure according to the present invention. However, for simplicity and clarity of illustration, the attachment structure at only one end of the handle will be shown.

The attachment structure includes a plate 2 which is bent to hat shape. An intermediate portion 3 of plate 2 has an opening 4 therethrough in the form of a keyhole slot having a narrow portion 5. The handle and its attachment are secured at each end to a container 6 of which only a fragment is shown in the drawing. Container 6 may be of any conventional type. It is preferred that the plate 2 be secured to container 6 by means of spaced portions of plate 2 on opposite sides of intermediate portion 3 thereof, as by welding, riveting, cementing or the like. Although the container 6 may be made of any of a variety of materials, it is preferred that it be made of metal. Similarly, plate 2 may be secured to container 6 at any point on the side walls of container 6 or even on the lid of container 6. Preferably, however, the plates 2 at each end of the handle 1 are secured to container 6 at upper portions of the side walls of container 6. These upper portions may lie either on the inner or on the outer sides of the walls of container 6. The plate 2 is secured to the inner side of the upper rim of the side walls of the container; however, it is equally within the invention that plate 2 be secured to the outer side of the side walls, in which case the ends of the handle 1 would point toward each other instead of away from each other.

A disc 7 of elastic deformable material such as plastic is secured to the underside of intermediate portion 3 in spaced relationship to container 6. Retainers 8 secure disc 7 is position. Disc 7 has a bore therethrough which is similar to and aligned with the enlarged portion of keyhole slot 4, the bore in disc 7 and the enlarged part of keyhole slot 4 having a diameter about the same as or a little greater than the diameter of handle 1. Disc 7, however, has nothing corresponding to narrow portion 5 of keyhole slot 4, so that disc 7 at least partially covers that narrow portion 5.

As can also be seen in FIG. 1, the ends of handle 1 are provided with diametrically opposed barbs or fins 9 having a width no greater than the width of narrow portion 5. If the greatest dimension of slot 4 is considered to be the dimension $a$, and if the height of each barb 9 is considered to be $x$, then it will be seen that upon inserting the end of handle 1 in slot 4, the barb opposite narrow portion 5 will ride upon the edge of the enlarged portion of keyhole slot 4 so that the end of handle 1 will be displaced a distance $x$ perpendicular to its direction of movement, and a barb 9 will penetrate narrow portion 5 to a depth equal to $2x$. Accordingly, the end of handle 1 is appropriately recessed in the region of barbs 9, as shown in the FIG. 1, so as to avoid interference with the edges of slot 4.

The material of disc 7 being elastically deformable, the end of handle 1 can penetrate despite the presence of barbs 9 and despite the axial misalignment of handle 1 from the bore of disc 7. When fully penetrated, the barbs 9 will be disposed behind, that is, on the underside of disc 7 and will prevent withdrawal of handle 1. It is also preferred that the equilibrium position of the container when suspended from the handle be substantially different from that in FIG. 1, so that the handle turns through a substantial angle between insertion as in FIG. 1 and utilization. In this way, the narrow portion 5 of the keyhole slot will be in some position other than straight up, when the container is being carried by its handle, so that inadvertent withdrawal of the handle from the keyhole slot is impossible in that position.

Having described my invention, I claim:

1. In a container having a handle, the improvement comprising means mounting the handle on the container, said means comprising a plate secured to the container and having an outwardly projecting intermediate portion, said intermediate portion having a keyhole slot therethrough, resilient deformable means, means mounting said resilient deformable means on the inner side of said intermediate portion at least partially covering the narrow portion of the keyhole slot, the adjacent end of the handle having a laterally extending fin thereon such that when the end of the handle passes through the keyhole slot, said fin pushes aside the resilient deformable means that at least partially covers the narrow portion of the keyhole slot and engages behind said resilient deformable means.

2. A structure as claimed in claim 1, said resilient deformable means being spaced from the container on which said plate is secured.

3. A structure as claimed in claim 1, said adjacent end of the handle having a pair of said fins on opposite sides thereof.

4. A structure as claimed in claim 1, said resilient means comprising a member of elastic deformable material through which said end extends.

5. A structure as claimed in claim 1, the container having an equilibrium position when supported by said handle in which said fin is rotated a substantial angle from the position in which it enters said slot.

(References on following page)

References Cited

UNITED STATES PATENTS

| | | | |
|---|---|---|---|
| 945,554 | 1/1910 | Lachman | 220—91 |
| 1,646,537 | 10/1927 | Hurley | 220—91 |
| 1,568,359 | 1/1926 | Assmann | 220—91 |
| 1,917,284 | 7/1933 | Young | 220—91 |
| 2,176,711 | 10/1939 | Gorman | 220—91 |

FOREIGN PATENTS 804,216  11/1958  Great Britain.

RAPHAEL H. SCHWARTZ, *Primary Examiner.*